Sept. 25, 1962 M. L. PEEK ET AL 3,055,467
SHUTTER CONSTRUCTION AND METHOD OF MAKING THE SAME
Filed Feb. 19, 1960 3 Sheets-Sheet 1
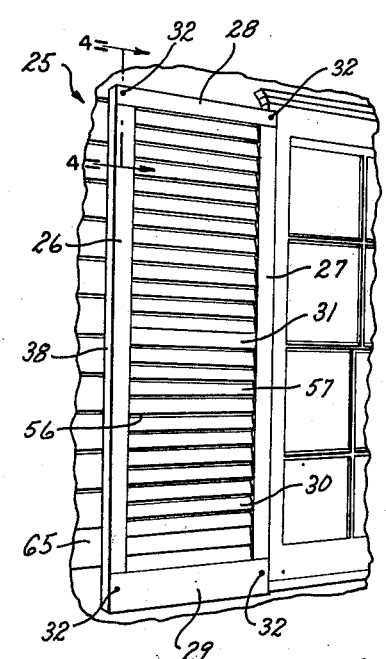
FIG.1
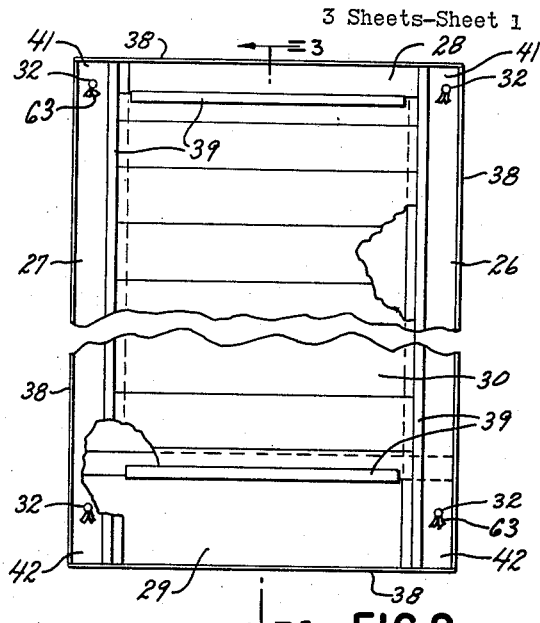
FIG.2
FIG.3
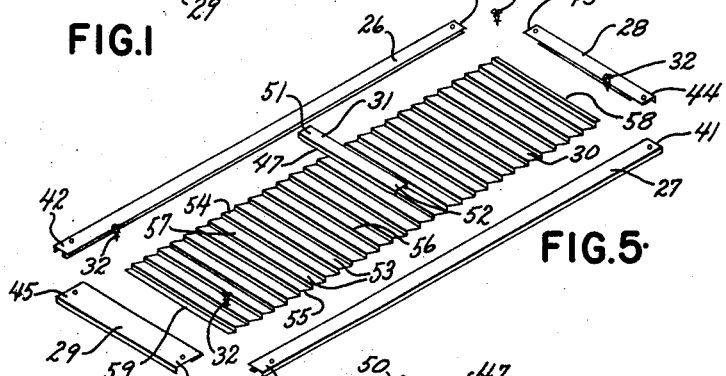
FIG.5
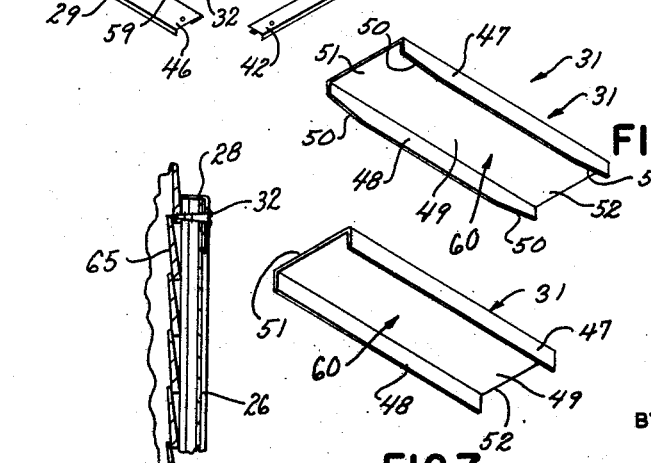
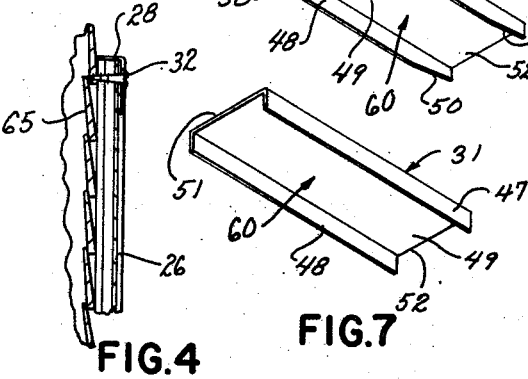
FIG.4 FIG.6 FIG.7
INVENTORS
MARION L. PEEK
N. EVERRETT WAHLSTROM
BY
Glenn & Jackson
THEIR ATTORNEYS

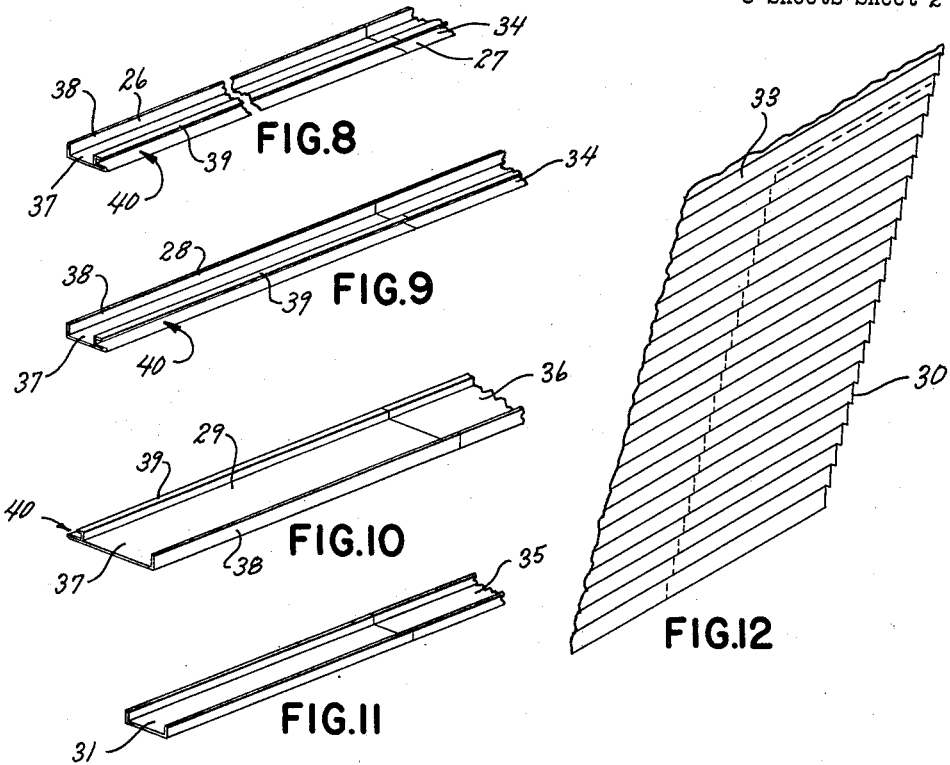
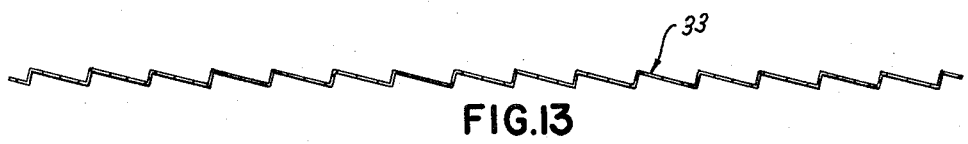
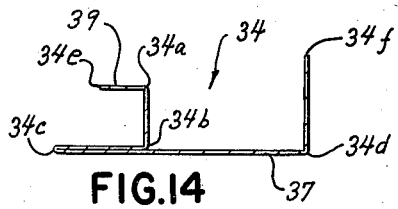
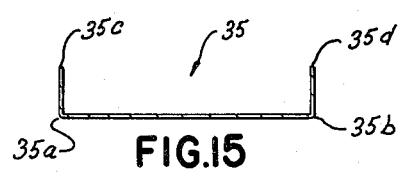
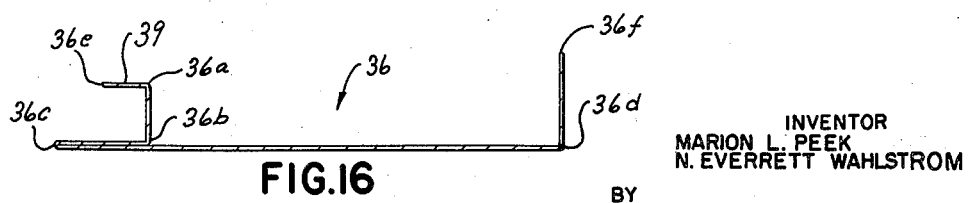

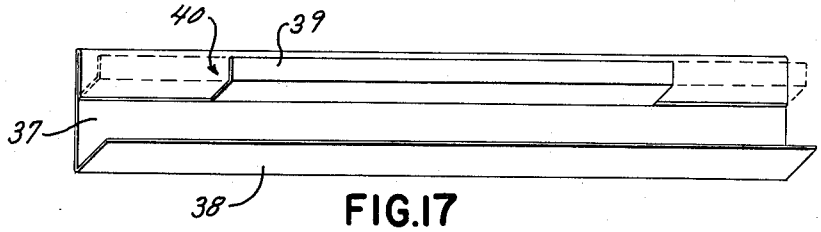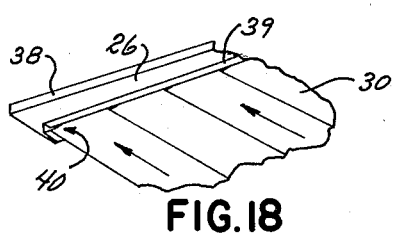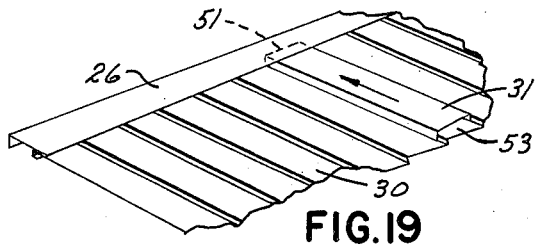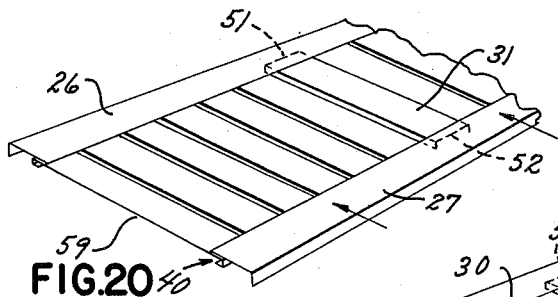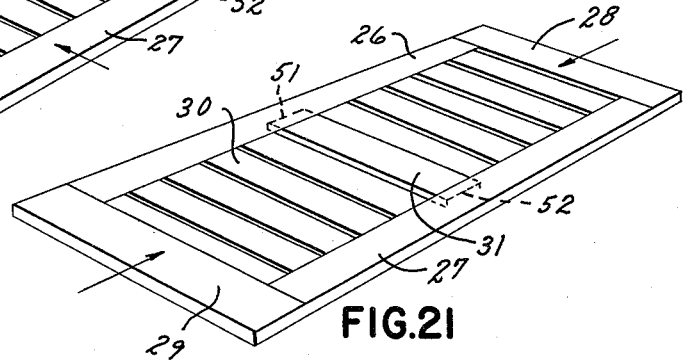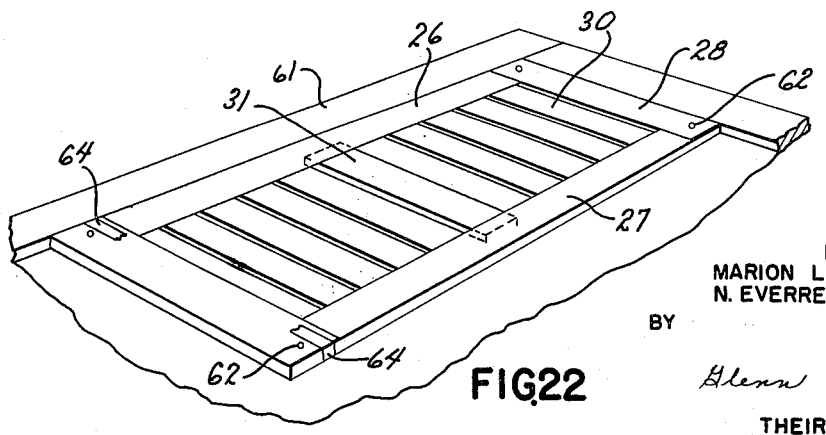

United States Patent Office 3,055,467
Patented Sept. 25, 1962

3,055,467
SHUTTER CONSTRUCTION AND METHOD OF MAKING THE SAME
Marion L. Peek and Nils Everrett Wahlstrom, Atlanta, Ga., assignors to Reynolds Aluminum Supply Company, a corporation of Georgia
Filed Feb. 19, 1960, Ser. No. 9,782
1 Claim. (Cl. 189—54)

This invention relates to an improved shutter construction and to the method of making the same or the like.

According to this invention, aluminum sheet material, of .020 inch gauge for example, may be fabricated into a relatively small number of basic shutter stock sections, such as four sections, by simple but effective straight line bending operations which are capable of maintaining close tolerances and neat formations or sections. The ease and effectiveness of manufacture of these stock sections will now be apparent to those skilled in the art.

These four sections, together with four installation screws for each shutter, may be cut at a dealer's modest tool shop, for example, by a simple table saw and simple band saw, to proper size for the shutter construction of this invention because of the aluminum construction thereof. These sections may then be assembled on an "on the spot" squaring jig and may be temporarily held in squared condition by the four screws and masking tape so the assembled shutter may be neatly attached to the wall of a building by the four screws. The ease and effectiveness of the assembly of these shutters will now be apparent to those skilled in this art.

The shutter construction so produced has a pleasing semblance to the old fashioned wood shutter, including a pleasing imitation of the wood slats of such a shutter. Yet the shutter of this invention is made from four simple stock sections in a simple manner. It retains its original freshness for indefinite periods of time because of the aluminum material or alloy and because of its factory applied coating.

Such a shutter construction of this invention generally comprises a pair of spaced parallel elongated shutter side rails and a pair of spaced parallel elongated shutter top and bottom end rails interconnected to the side rails in such a manner that the shutter rails frame and carry a central shutter panel to form the improved shutter construction.

Accordingly, it is an object of this invention to provide an improved shutter construction having one or more of the novel features set forth above and/or hereinafter shown or described.

Another object of this invention is to provide an improved method for making such a shutter construction or the like.

Other objects, uses and advantages of this invention are apparent from a reading of this description and from the accompanying drawings forming a part thereof and wherein:

FIGURE 1 is a perspective view of the improved shutter construction of this invention secured to a wall of a house or the like.

FIGURE 2 is a rear view of the shutter construction of FIGURE 1 and illustrates certain of the parts partially broken away.

FIGURE 3 is an axial cross-sectional view of the shutter construction and is taken on line 3—3 of FIGURE 2.

FIGURE 4 is a fragmentary cross-sectional view taken on line 4—4 of FIGURE 1 and illustrates the shutter mounting means.

FIGURE 5 is an exploded perspective view illustrating the various parts of the shutter construction of this invention.

FIGURE 6 is a perspective view of one embodiment of the center mullion of this invention.

FIGURE 7 is a view similar to FIGURE 6 illustrating another embodiment of the mullion.

FIGURES 8–12 are respectively perspective views illustrating the method of fabricating the various basic shutter parts from stocks of material.

FIGURES 13–16 are respectively enlarged cross-sectional views of the four basic shutter sections.

FIGURE 17 is a perspective view illustrating the method of trimming the shutter end rails of this invention.

FIGURES 18–22 are respectively perspective views illustrating the method of assembling the various parts of this invention to provide the improved shutter construction.

The shutter construction of this invention is indicated generally by the reference numeral 25 in FIGURE 1 and comprises a pair of opposed shutter side rails 26 and 27, a pair of opposed shutter top and bottom end rails 28 and 29, a central shutter panel 30, and a crosspiece section or mullion 31, the parts 26–31 being secured together as a unit by a plurality of screws 32 in a manner more fully set forth hereinafter.

The above shutter parts 26—31 may be produced from four, possibly three, stocks of material 33–36, FIGURES 13–16 respectively, which may be prepared and coated at a factory. These four stocks of material may include: (1) a slat-like section 33, FIGURE 13, to produce the central continuous, stepped slat-like shutter panel 30; (2) a straight line bent section 34, FIGURE 14, to produce the side rails 26 and 27 and the top rail 28 of the shutter 25, and possibly the bottom rail 29 thereof; (3) a straight line bent section 35, FIGURE 15, to produce the central mullion 31, and (4) optionally, a straight line bent section 36, FIGURE 16, similar to section 34 but wider, to produce the bottom rail 29, if such extra width is desired.

These four sections or stocks of material 33–36 are produced by fast and very simple and sure factory operations.

If a semi-permanent color is desired in the shutter, .020 gauge, yard wide, aluminum sheet material from long length coils for example, may be coated with "Dulux" enamel, made and sold by the E. I. du Pont de Nemours and Company (Inc.) of Wilmington, Delaware, in a well known "continuous line" operation where the enamel is applied and baked to produce a durable product which may be cut and fabricated as herein described while maintaining its beautiful finish.

The slat-like section 33, FIGURE 13, may be produced from such enameled sheet by matching stepped rolls by a now well known fast operation.

The section 34, FIGURE 14, may be made by cutting the desired size of sheet and bending it at 34a, 34b, 34c, and 34d in any desired order on straight line benders of high accuracy and neatness. Likewise, the section 35, FIGURE 15, may be similarly cut and bent at 35a and 35b in any desired order. Also the section 36, FIGURE 16, may be similarly cut and bent at 36a, 36b, 36c, and 36d in any desired order.

The steps of the section 33 may be spaced to produce 15 spaces per 30 inches of length and the height of the steps may be in the order of 3/8 of an inch.

The dimensions of the section 34 may be 3/8 of an inch from 34e to 34a; 7/16 of an inch from 34a to 34b; 3/4 of an inch from 34b to 34c; 2 inches from 34c to 34d; and 3/4 of an inch from 34d to 34f.

The dimensions of the section 35 may be 3/8 of an inch from 35c to 35a and from 35d to 35b; and 2 inches from 35a to 35b.

The dimensions of the section 36 may be identical with corresponding dimensions of the section 34 except that 36c to 36d may be 4 inches instead of 2 inches.

The shape of the sections 34 and 36 permit the cutting of portions of the flange like inside edges to permit the sections 34 and 36 to be overlapped at the corners of the shutter in a very efficient manner as herein elsewhere described.

These stocks of material or sections 33–36 may be cut to 10 or 12 foot lengths and packed in cartons for shipment to dealers along with installation screws 32, such as No. 12, 1½ inches self-tapping hex-head aluminum screws.

The dealer may then cut the sections 33–36 to smaller lengths, as needed, to supply shutter constructions 25 of desired width and length to match windows or doors of various sizes.

In particular, when it is desired to manufacture the shutter construction 25 of FIGURE 1 from the above-described stock sections 33–36, the side rails 26 and 27 are each cut from the stock section 34, FIGURE 8, by a simple sawing operation, the lengths of the rails 26 and 27 each being approximately the exact length of the desired shutter construction 25.

The top rail 28 is also cut from the stock 34, FIGURE 9, and has a length approximately the exact width of the desired shutter construction 25. However, it is to be understood that the top rail 28 may be cut from stock material having a different width than the width of the stock section 34 if desired.

Since the side rails 26 and 27 and top rail 28 are cut from the same section 34, each has a cross-sectional configuration as illustrated in FIGURE 14 which comprises a flat top or outer surface 37 having a downwardly extending flange 38 at the outer edge thereof and an under turned flange 39 at the inner edge thereof. The flange 39 is so constructed and arranged that the same defines an inwardly facing shutter panel holding bight portion or channel 40 hidden beneath the top surface 37 thereof. The channel 40 extends between the opposed ends 41 and 42 of the respective side rails 26 and 27 and between the opposed ends 43 and 44 of the top rail 28.

The bottom end rail 29 is cut from the bottom end rail section 36, FIGURE 10, and has a length approximately equal to the exact width of the desired shutter construction 25. However, it is to be understood that the bottom end rail 29 may be cut from the stock section 34, if desired, or from any other suitable section. The bottom end rail 29 has a cross-sectional configuration as illustrated in FIGURE 16 which comprises a flat top or outer surface 37 having a flange 38 at the outer edge thereof and an under turned flange 39 at the inner edge thereof to define a bight portion or channel 40 extending between opposed ends 45 and 46 of the rail 29 in the same manner as the rails 26, 27 and 28.

To permit assembly of the rails 26–29 in the manner illustrated in FIGURE 1, the ends of the flange 39 of the top rail 28 and the bottom rail 29 are each cut away in a simple manner. In particular, the bottom end rail 29 or top end rail 28 is illustrated in FIGURE 17 with the ends of the flange 39 cut away for a distance approximately equal to or slightly greater than the width of the side rails 26 and 27. For example, the distance may be 2⅛ inches.

This trimming operation may be performed by sawing the flange 39 vertically downwardly toward the flat surface 37 thereof and then bending the severed portion back and forth until the same breaks away at the bend 34b or 36b.

The center cross-piece or mullion 31 is cut from the section 35, FIGURE 11, and has a length approximately equal to or is slightly smaller than the distance between the vertical sections 34a—34b of the side rails 26 and 27 which are spaced the desired distance apart to form the shutter construction 25. For example, the mullion 31 may have a length equal to the width of the shutter minus 3⅛ inches. The mullion 31 has a pair of opposed parallel flanges 47 and 48 extending from the outer edges of a flat top surface 49 thereof.

If desired the central mullion 31 may have the ends of the flanges 47 and 48 angularly cut away as illustrated at 50 in FIGURE 6 at the opposed ends 51 and 52 thereof to provide for a wedging action later to be described. However, the central mullion 31 may be left untrimmed in the manner illustrated in FIGURE 7 if desired.

The central slat-like shutter panel 30 is cut from the stock 33 as illustrated in FIGURE 12. The panel 30 has a width approximately equal to or is slightly smaller than the distance between the vertical portions 34a—34b of the side rails 26 and 27 when the side rails are spaced the desired distance apart. For example, the panel 30 may have a width equal to the width of the shutter minus 2⅝ inches. Similarly, the length of the panel 30 is approximately equal to or is slightly smaller than the distance between the end rails 28 and 29 when the rails 28 and 29 are spaced apart the desired distance to form the shutter construction 25. For example, the length of the panel 30 may be equal to the length of the shutter 25 minus 4½ inches.

The slat-like panel 30 has a plurality of longitudinally disposed steps 53 extending between opposed side edges 54 and 55 thereof and each includes a riser portion 56 and an inclined portion 57. The height of each riser 56 is approximately equal to or is slightly smaller than the height of the bight portions 40 of the rails 26–29. In this manner, it does not make any difference where the inclined portions 57 of the panel 30 are cut to define the end edges 58 and 59 thereof as the bight portions 40 of the end rails 28 and 29 are of a height sufficient to receive the respective edges 58 and 59 of the panel whether the same is cut adjacent the risers 56 or intermediate the same.

After all of the parts 26–31 have been cut from the appropriate sections 33–36 in the above manner, the shutter construction 25 is formed in any desired location by inserting or disposing the edge 54 of the central panel 30 in the bight portion or channel 40 of the side rail 26 as illustrated in FIGURE 18. The side rail 27 may alternately be assembled first, if desired.

Subsequently, the mullion 31 of FIGURES 6 or 7 has the flanges 48 and 49 thereof, defining a bight portion or channel 60, disposed over a selected step 53 of the panel 30 and the end 51 thereof disposed or inserted in the channel 40 of the side rail 26 as illustrated in FIGURE 19.

The other shutter side rail 27, FIGURE 20, is then brought into position and receives the side edge 55 of the panel 30 and the end 52 of the mullion 31 in the bight portion or channel 40 thereof. When the mullion 31 has the ends 50 cut away as illustrated in FIGURE 6, the insertion of the mullion 31 in the channels 40 between the panel 30 and the top 37 of the rails 26 and 27 is greatly facilitated. Further, the ends 50 of the mullion 31 permit the mullion 31 to wedge the mullion 31 and panel 30 in the channels 40 of the side rails 26 and 27.

As illustrated in FIGURE 21, the top shutter end rail 28 and the bottom shutter end rail 29 are assembled to the side rails 26 and 27 by having the respective channels 40 thereof receive the respective end edges 58 and 59 of the central panel 30. As the end rails 28 and 29 are pushed onto the central panel 30, the ends 43, 44 and 45, 46 thereof respectively overlap and are superimposed on the ends 41 and 42 of the side rails 26 and 27.

Since the ends of the flanges 39 of the shutter end rails 28 and 29 are cut away as illustrated in FIGURES 2 and 17, the respective ends 41 and 42 of the shutter side rails 26 and 27 abut the flanges 38 of the end rails 28 and 29 when the end rails 28 and 29 are assembled thereto. Thus, the shutter rails 26–29, by the hidden bight portions 40 thereof, frame and carry the central panel 30 and mullion 31 without being welded, bolted or the like to the panel 30 and the mullion 31.

To square up the assembled parts 26–31, the partially assembled shutter construction 25 is then placed in a right angled jig 61, FIGURE 22, and the overlapping ends 43, 44 and 45, 46 of the end rails 28 and 29 and 41, 42 of the side rails 26 and 27 are transversely bored at 62 by a simple hand drill or the like.

Subsequently, the screws 32 are respectively placed in the bores 62 and are utilized to temporarily maintain the shutter construction 25 in assembled squared relation until the shutter construction 25 is installed. For example, adhesive tape 63 or the like, FIGURE 2, may be detachably secured to the free ends of the screws 32 after the same have been inserted in the bores 62 to maintain the screws 32 in place. Also, masking tape 64 or the like, FIGURE 22, may be applied to the four corners of the shutter to hold it in a squared condition while being transported to the site of use.

To install the thus formed shutter construction 25, it is only necessary to place the shutter 25 against the desired wall, such as wall 65 of FIGURES 1 and 4, and drive the screws 32 into the wall to hold the shutter construction 25 in place. Therefore, the screws 32 not only maintain the shutter parts 26–31 in assembled relation but also serve the function of detachably securing the shutter construction 25 to the desired support means.

If desired, the exposed heads of the screws 32 can be subsequently painted the same color as the shutter 25.

Therefore, it can be seen that there has been provided an improved shutter construction that can be easily fabricated from a relatively few basic parts regardless of the desired size of the shutter and that is strong, rustproof, light, and attractive in design. Further, there has been provided an improved method for making such an improved shutter construction or the like.

The word "aluminum" has herein used is intended to apply to commercial aluminum and any suitable alloys thereof. Certain adjectives referring to directional relationships, such as above, below, up, down, etc., are used for convenience of description and are not intended to limit the broad scope of this invention.

While the form of the invention now preferred has been disclosed, as required by statute, other forms may be used, all coming within the scope of the claim which follows.

What is claimed is:

In combination, a pair of spaced parallel elongated shutter side rails each having a longitudinally disposed bight portion facing the bight portion in the other side rail, a pair of spaced parallel elongated shutter end rails each having a longitudinally disposed bight portion facing the bight portion in the other shutter end rail, said shutter rails being secured together to provide a substantially rectangular frame, a substantially rectangular central shutter panel having opposed side and end edges respectively received in said bight portions of said shutter rails and having a stepped cross-sectional configuration, and a transversely disposed elongated mullion having a pair of opposed ends respectively disposed in the bight portions of said shutter side rails, said mullion having a longitudinally disposed bight portion receiving one of said steps of said central shutter panel.

References Cited in the file of this patent

UNITED STATES PATENTS

| | | |
|---|---|---|
| 173,722 | Hayes | Feb. 22, 1876 |
| 2,596,569 | Leigh | May 13, 1952 |
| 2,835,001 | Matthews | May 20, 1958 |

FOREIGN PATENTS

| | | |
|---|---|---|
| 25,297 | France | Oct. 3, 1922 |
| | (1st addition to 532,356) | |